US006931126B1

(12) United States Patent
Jakobsson et al.

(10) Patent No.: US 6,931,126 B1
(45) Date of Patent: Aug. 16, 2005

(54) NON MALLEABLE ENCRYPTION METHOD AND APPARATUS USING KEY-ENCRYPTION KEYS AND DIGITAL SIGNATURE

(75) Inventors: Bjorn Markus Jakobsson, Hoboken, NJ (US); Claus Peter Schnorr, Bad Nauheim (DE)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/487,946

(22) Filed: Jan. 19, 2000

Related U.S. Application Data

(63) Continuation-in-part of application No. 09/237,522, filed on Jan. 27, 1999, now Pat. No. 6,507,656.

(51) Int. Cl.[7] .................................................. H04L 9/00
(52) U.S. Cl. ............................ 380/30; 380/28; 713/169; 713/176
(58) Field of Search ................................. 713/169, 176; 380/28, 30

(56) References Cited

U.S. PATENT DOCUMENTS

| | | | | |
|---|---|---|---|---|
| 4,200,770 A | * | 4/1980 | Hellman et al. | 380/30 |
| 5,271,061 A | * | 12/1993 | Crandall | 380/28 |
| 5,539,826 A | * | 7/1996 | Dwork et al. | 713/169 |
| 5,721,781 A | * | 2/1998 | Deo et al. | 705/67 |
| 6,396,928 B1 | * | 5/2002 | Zheng | 380/285 |
| 6,507,656 B1 | * | 1/2003 | Jakobsson | 380/30 |

OTHER PUBLICATIONS

Schneier, Bruce; Applied Cryptography; 1996; John Wiley & Sons, Inc.; 2nd Edition; pp. 21–46, 213–229, 461–525.*
Dolev et al.; 'Non–Malleable Cryptography'; 1991; ACM; pp. 542–552.*
Grescenzo et al.; 'Non–Interactive and Non–Malleable Commitment'; 1998; ACM; pp. 141–150.*
ElGamal, Taher; 'A Public Key Cryptosystem and a Signature Scheme Based on Discrete Logarithms'; Jul. 1985; IEEE Transactions on Information Theory; vol. 31, No. 4; pp. 469–472.*
T. Beth et al, "Non Supersingular Elliptic Curves for Public Key Cryptosystems", © 1998, Springer–Verlag, 1–12, Universitat Karlsruhe.
Victor S. Miller, "Use of Elliptic Curves in Cryptography", © 1998, Springer–Verlag, 1–11, IBM Research.

* cited by examiner

*Primary Examiner*—Gilberto Barrón
*Assistant Examiner*—Jung Kim

(57) ABSTRACT

A fast encryption method particularly useful for long message lengths is provided. A message m is encrypted using a transmitter secret key z to form a quantity E. A transmitter processor prepares a quadruplet ($a_{new}$, $b_{new}$, $s_{new}$, E) where:

$$a_{new} = z * y^c \text{modulo } p;$$

$$b_{new} = g^c \text{modulo } p;$$

$$s_{new} = \text{signature}_c(a_{new}, b_{new}, E).$$

As in previous embodiments $y = g^x$ modulo p is the public key and x is the receiver secret key. The parameters g, x, and p according to methods known to a person skilled in the art and the parameter g is a generator of the group $G_p$. The parameter c is a random number. The transmitter processor sends the quadruplet ($a_{new}$, $b_{new}$, $s_{new}$, E) to a receiver processor. The receiver processor verifies the signature on $s_{new}$ using methods known in the art. The receiver processor then decrypts $a_{new}$ and $b_{new}$ using the receiver secret key x to get the transmitter secret key z, i.e. in the following manner $z = a_{new}/b_{new}^x$. The receiver processor uses the transmitter secret key z to decrypt E to get the message M.

15 Claims, 4 Drawing Sheets

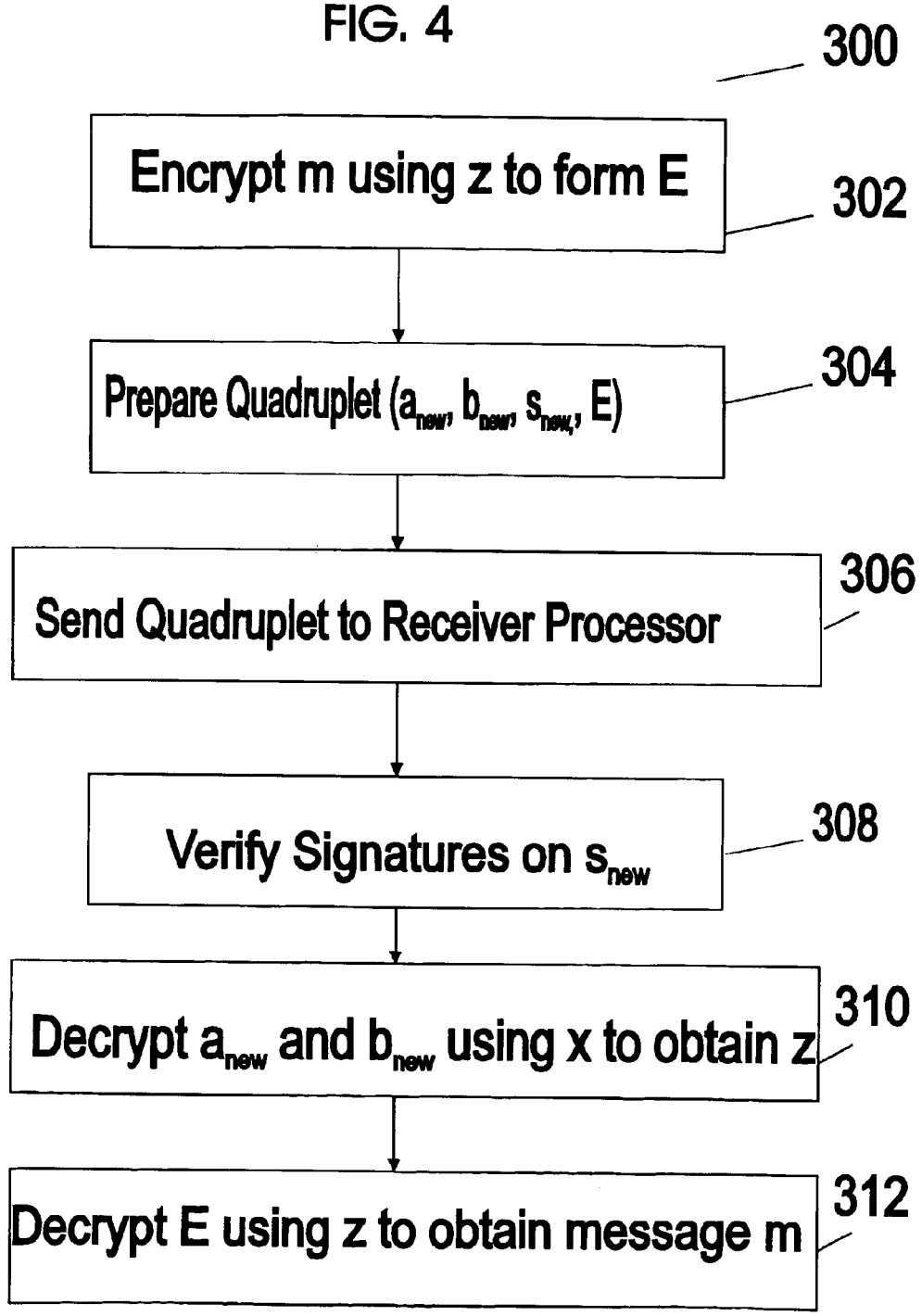

NON MALLEABLE ENCRYPTION METHOD AND APPARATUS USING KEY-ENCRYPTION KEYS AND DIGITAL SIGNATURE

CLAIM FOR PRIORITY

The present application is a continuation in part of parent application Ser. No. 09/237,522 which was filed on Jan. 27, 1999 now U.S. Pat. No. 6,507,656 and claims the priority of said parent application. The parent application was pending at the time of filing of the present continuation in part application.

FIELD OF THE INVENTION

This invention relates to improved methods and apparatus for encryption and decryption of data.

BACKGROUND OF THE INVENTION

The present invention deals with the area of encryption and decryption of data messages. Encryption takes a cleartext message and produces an encrypted message also called a ciphertext. Decryption takes an encrypted message and produces its corresponding cleartext message.

It is known in the prior art how to take a message and turn it into an encrypted message using a first user's public key. The first user upon receiving the encrypted message can then decrypt it, to reveal the original message, using the first user's secret key. The first user's public key is as the name implies, available to the public so that others can send messages to the first user. However, the first user's secret key is not available. The public key is associated with a one-way function, i.e. once the message is encrypted it cannot be decrypted without the secret key even though the public key and the encryption algorithms are known.

El Gamal encryption is a standard method of encryption known in the art. In this method a first processor performing the encryption step, takes a message m as an input; chooses a random value "c", and produces the outputs $a = m*y^c$ modulo p; $b = g^c$ modulo p. For El Gamal decryption, a second processor (which may be the first processor) calculates the data message m from $m = a/b^x$ modulo p. In the above $y = g^x$ modulo p is the public key and x is the secret key. The parameters g, x, and p and other system parameters are picked according to methods known to a person skilled in the art. The parameter g is a generator of the group $G_p$. If we take all possible values of x and compute $g^x$, this result will take all values in the group $G_p$ which is a large set of values. The value c is chosen at random by the entity that performs the encryption.

The ElGamal encryption method has the following weaknesses:

(1) Given an encryption (a,b) of an unknown data message m, it is possible to produce an encryption of a still unknown message, which corresponds to the value dm, by computing (a d modulo p, b). For example, if (a,b) is an encryption of the value m=3, then (a',b')=(4a,b) is an encryption of the value 4m=12. It is not necessary to know m to compute (a',b') from (a,b).

(2) Given the encryption pair of ciphertext (a,b) of data message m, it is possible to produce a ciphertext of $m^d$ as ($a^d$ modulo p, $b^d$). For example, a correct message could be raised to some exponent and there would be no way of telling that that had occurred.

(3) Given two ciphertexts (a1, b1) and (a2, b2), with (a1, b1) being an encryption of m1 and (a2, b2) being an encryption of m2, it is possible to produce a ciphertext of the product of m1*m2 modulo p as (a1*a2 modulo p, b1*b2 modulo p).

These three disadvantages and other and related ones are referred to in literature as malleability. Malleability is a threat to security, correctness of decryption of a message, and privacy in many situations. For example in an auction scenario if an offer for a product by a first individual is m, given the ciphertext a second individual can overbid and make his offer 2*m without knowing how much "m" is but knowing that the second individual will win the bidding process. Using a similar attack one can duplicate votes in an election to determine (later when all votes are decrypted) what you voted (by looking for a duplicate). In the prior art malleability is avoided by forcing the value of the data message m to be encrypted to be of a particular form, such as to always end in a particular string of length approximately 100 bits. This technique of avoiding malleability has two disadvantages:

(a) First, it is not possible to determine that an encrypted message is of the valid form without decrypting it.
(b) Secondly, this is not known to result in a problem-free system (i.e. a 'non-malleable encryption') and cannot be proved to result in a non-malleable encryption.

However, prior to the parent application there were no approaches better at dealing with the malleability problem without losing efficiency of the resulting scheme and ciphertext.

The parent application provides a non-malleable encryption method where an encryption technique and a signing technique are used. An encryption processor takes a data message and produces an encryption using an encryption process. The encryption may also be called a ciphertext and typically would be comprised of first and second ciphertext portions. A signing processor takes the encryption and adds a signature to the first and second ciphertext portions using, for example, the second ciphertext portion as the public key for the signature. A receiver processor receives the ciphertext and the signature, decrypts the ciphertext to form a first data message, and determines if the first data message is valid by verifying the signature.

The encryption processor of the parent application may employ ElGamal encryption for the encryption process to form the encryption. The signing processor may perform a Schnorr signature process for the signing process or any other similar discrete log based signature, as appreciated by those skilled in the art. The signing processor may use part of the encryption process to perform the signing process.

SUMMARY OF THE INVENTION

The present invention provides an improvement over the parent application. The improvement is particularly useful for long data message lengths. The present invention also uses an encryption technique and a signing technique to provide a non-malleable encryption. An encryption processor takes a data message and produces an encryption using an encryption process. The result of the encryption may also be called a ciphertext. However, unlike the parent application, in an embodiment of the present invention, the ciphertext typically would be comprised of first, second, and third portions. This ciphertext could be of the form of: ($a_{new}$, $b_{new}$, E). A signing processor takes the encryption and adds a signature $s_{new}$ to form a quadruplet of first, second, third, and fourth portions in the form of: ($a_{new}$, $b_{new}$, $s_{new}$, E). A receiver processor receives the quadruplet, decrypts the ciphertext to form a first data message, and determines if the first data message is valid by verifying the signature.

The encryption processor may employ ElGamal encryption for the encryption process to form the three portions of the ciphertext ($a_{new}$, $b_{new}$, E). The signing processor may perform a Schnorr signature process for the signing process or any other similar discrete log based signature, as appreciated by those skilled in the art. The signing processor may use part of the encryption process to perform the signing process.

The above fast encryption method of is particularly useful for long message lengths. A message m can be encrypted using a transmitter secret key z to form a quantity E. A transmitter processor prepares a ciphertext quadruplet ($a_{new}$, $b_{new}$, $s_{new}$, E) where:

$a_{new} = z * y^c$ modulo $p$;

$b_{new} = g^c$ modulo $p$;

$s_{new} = \text{signature}_c(a_{new}, b_{new}, E)$;

As in the parent application, $y = g^x$ modulo p is the public key and x is the receiver secret key. The parameters g, x, and p according to methods known to a person skilled in the art and the parameter g is a generator of the group $G_p$. The parameter c is a random number. The transmitter processor sends the ciphertext quadruplet ($a_{new}$, $b_{new}$, $s_{new}$, E) to a receiver processor. The receiver processor verifies the signature on $s_{new}$ using methods known in the art. The receiver processor then decrypts $a_{new}$ and $b_{new}$ using the receiver secret key x to get the transmitter secret key z, i.e. in the following manner: $z = a_{new}/b_{new}^x$. The receiver processor uses the transmitter secret key k to decrypt E to get the message M.

BRIEF DESCRIPTION OF THE DRAWINGS

FIG. 4 shows a flow chart of a method in accordance with another embodiment of the present invention.

DETAILED DESCRIPTION OF THE DRAWINGS

The embodiment of the parent application will be described with reference to FIGS. 1 and 2. In the parent application in one embodiment an apparatus comprising an encryption processor and a signing processor is provided. The processors may in fact be part of the same personal computer. For some purposes the encryption processor and signing processor may need to be one and the same processor. For example, there are two parts of the standard El Gamal ciphertext, but these share the same value 'c', and so, the value "c" would be known by both the encryption processor and the signing processor. In fact the encryption processor and the signing processor may all need to be part of one and the same processor in some situations. The signature part may also use the value of c, and therefore, at least for the above example, needs to be part of the same processor or party.

Figure 1:
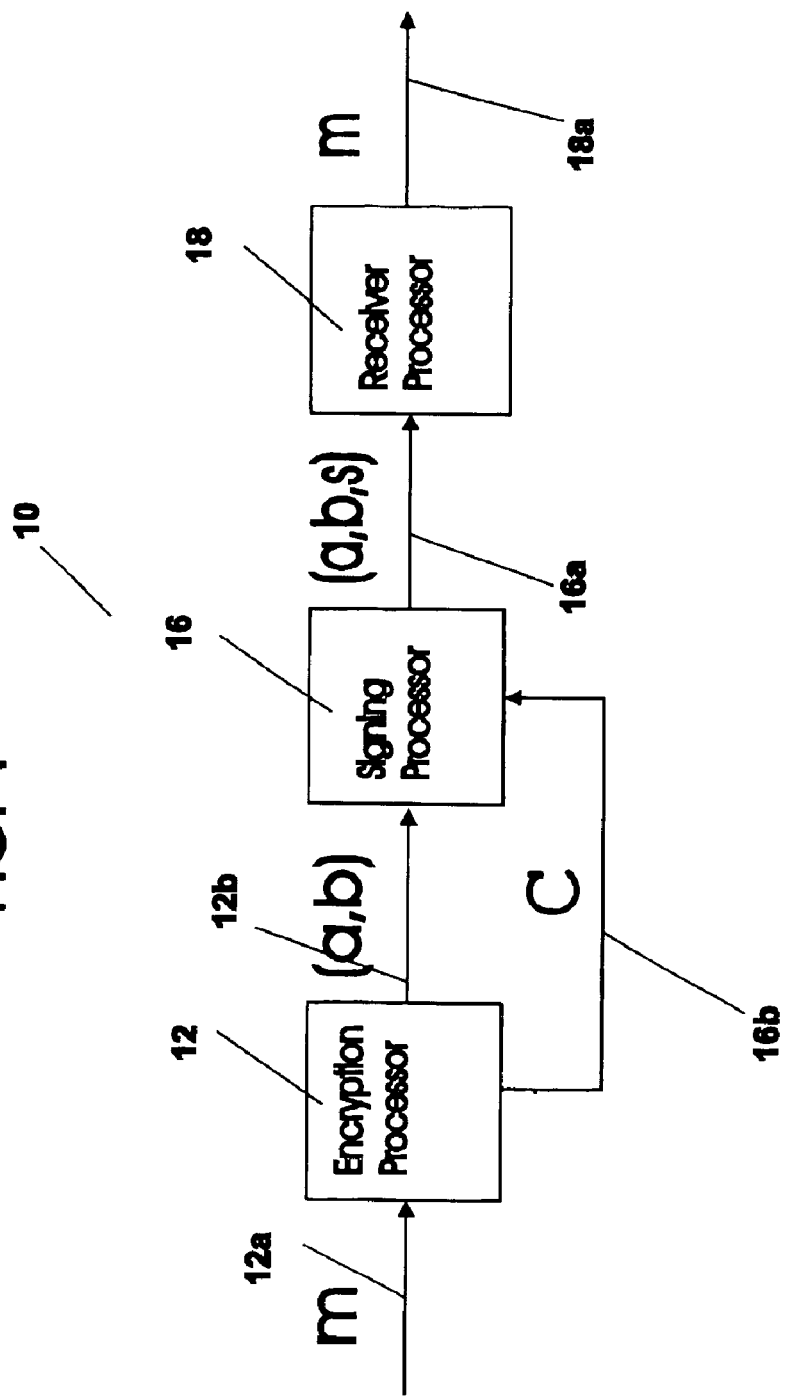
FIG. 1 shows a diagram of an apparatus in accordance with a first embodiment of the parent application.

FIG. 1 shows an apparatus 10 comprised of an encryption processor 12 and a signing processor 16. The signing processor is connected to a receiver processor 18. The processors 12 and 16 may actually be part of a single processor which may be a personal computer. The receiver processor 18 typically would be a separate personal computer but may also be part of the same personal computer.

In the apparatus 10 the encryption processor 12 has an input port 12a. The encryption processor 12 is also connected to the signing processor 16 via communications link 12b. Communications link 12b, and the other communications links mentioned herein, may be any apparatus for linking computers or circuitry such as a port connected to another port by a wire or a fiber. The signing processor 16 is connected to the receiver processor 18 via communications link 16a. The receiver processor 18 has an output port 18a. The encryption processor 12 is also connected to the signing processor 16 via port communications link 16b. It should be noted that one or more or all of the encryption processor 12, signing processor 16, and receiver processor 18 may be implemented in a single processor through a single piece of computer software.

The operation of the apparatus 10 of FIG. 1 is as follows and is also shown in part in the flow chart 100 of FIG. 2. A plaintext message "m" is sent to the input port 12a of encryption processor 12. The plaintext message may be a digital data message, which may be comprised of a plurality of digital data bits or signals. The message "m" is encrypted by the encryption processor 12 using a method such as ElGamal encryption or some other known encryption process. The encryption pair or encryption (a,b) is produced on communications link 12b and sent to the signing processor 16. The encryption process performed by the encryption processor 12 is shown in steps 102, 104, and 106 of FIG. 2. As shown in FIG. 2 for the input message "m", a random number "c" is first generated at step 102. The random number "c" is used to calculate the quantity $a = m * y^c$ modulo p and the quantity $b = g^c$ modulo p at the steps 104 and 106 in FIG. 2. The value "c" in this example would be in the range of $0 <= c <= q$; where q is the size of $G_p$.

The encryption pair (a,b) is sent to the signing processor 16. The random number c is also sent to the signing processor 16 from the encryption processor 12 via the communications link 16b At step 108 of FIG. 2, the signing processor 16 uses the random number 'c' which was chosen for the encryption process by encryption processor 12, to obtain a signature "s". The signing processor 16 may then execute step 110 of FIG. 2 by outputting the triplet (a,b,s) to the receiver processor 18.

The value for the signature "s" can be obtained for example by using the Schnorr signature scheme. For that scheme the following steps are followed:

(1) a random value k is picked where $1 <= k <= q$;

(2) $r = g^k$ modulo p is computed;

(3) $\sigma = k - x \, h(M, r) \mod q$ is computed; where h( ) denotes a so-called hash function; and M=(a,b) is the message to be signed.

(4) Output the signature (r, σ) which is what we call the signature "s";

The receiver processor 18 may use the input of (M, r, σ) in order to verify the signature and thus verify that the decrypted message is a decryption of a valid data message by verifying if $r = g^\sigma y^{h(M,r)}$ modulo p. The above signature generation and verification is well known to those skilled in the art.

Figure 2:
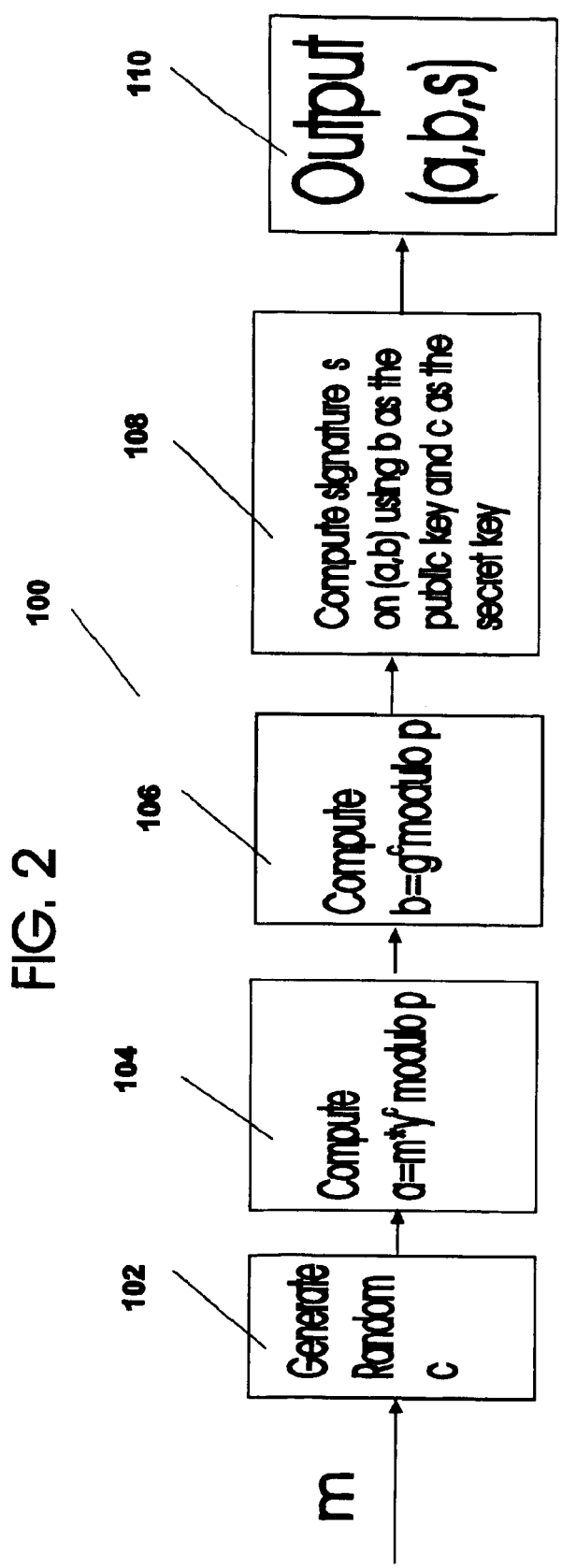
FIG. 2 shows a flow chart of a method in accordance with an embodiment of the parent application.

The signature "s" is appended to the encryption pair (a, b) to form the triplet (a,b,s) and this is output on communications link 16a, as shown by step 110 in FIG. 2. This triplet is received at the receiver processor 18. The receiver processor 18 can then decrypt the encryption pair (a,b) to obtain the original message m by calculating $m = (a/b)^x$; where x is the secret decryption key of a user. The receiver processor 18 can also use the value "b" as a public key to determine if the triplet (a,b,s) is valid or not tampered with.

Encryption methods, other than ElGamal can be used, particularly variations of ElGamal. Signature methods other than Schnorr can be used such as Digital Signature Standard (hereinafter "DSS") which is a U.S. signature standard. Instead of a signature method, a proof-of-discrete-log system can be used. Several such methods are well known in the literature. The Schnorr signature process uses one or both portions (a, b) of the standard ElGamal encryption as a public key, most likely just the portion 'b' of the standard ElGamal encryption and the corresponding secret portion (the random number 'c' above), to sign a message. A signature 's' is provided with the encrypted message. The signature 's' is a function of the encrypted message (a, b), potentially including publicly available information, such as the time or date. It can be publicly verified by anybody who gets the ciphertext, but can only be generated by a party with knowledge of the secret random number "c" used for encryption. In the example referred to, the signer's secret key is based on the random number "c" which is used by the entity or processor, such as encryption processor 12, which encrypts a message, such as message "m", and said encryption processor also preferably functions as a signing processor 16 which computes the ciphertext (a,b,s). The overall encryption data is now a triplet of (a,b,s). In this case (a,b) or portions thereof act as the public key, (a,b) or a function thereof is the message and "s" is the signature. The ciphertext (referring to (a,b, and s)) is said to be valid if "s" is the signature on (a,b) with respect to the chosen public key (which is (a,b, or functions of these)).

This new encryption method can be proved to be non-malleable, i.e. given some number of ciphertexts $(a_i, b_i, s_i)$, it is impossible to produce a new or valid ciphertext from the old ciphertexts, or a new and valid ciphertext with a plaintext message in any known way related to the plaintext messages corresponding to the old ciphertexts. Furthermore, the validity of a ciphertext can be publicly verified in an efficient manner using our proposed methods and apparatus. It retains the property that given a ciphertext (a,b,s), and two potential plaintext messages m1 and m2, it is impossible to determine which one corresponds to (a,b,s). The new ciphertext (a,b,s) as opposed to the old (a,b), is decrypted as before, i.e. by calculating $m=a/b^x$ modulo p after verifying that (a,b,s) is a valid ciphertext. The method described with reference to FIGS. 1 and 2 is for the parent application.

Figure 3:
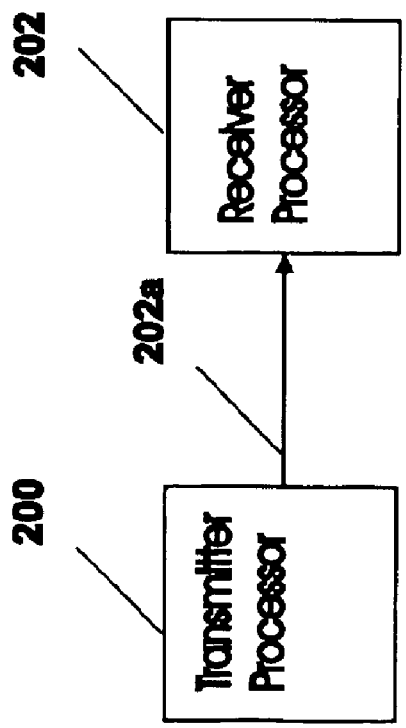
FIG. 3 shows a diagram of a transmitter processor and a receiver processor in accordance with an embodiment of the present invention.

FIG. 3 shows a transmitter processor 200 and a receiver processor 202 employing a fast encryption method in accordance with an embodiment of the present invention. The method is shown in the flow chart 300 in FIG. 4.

In accordance with the method shown by FIGS. 3 and 4, a new quantity, "z" is used. "z" will be called the "transmitter secret key" and is thus a secret key only known to the transmitter processor 200. At step 302 the transmitter processor 200 takes a message m and encrypts it using the transmitter secret key z to form a quantity E.

At step 304 the transmitter processor 200 prepares a quadruplet $(a_{new}, b_{new}, s_{new}, E)$ where:

$a_{new} = z*y^c$ modulo $p$;

$b_{new} = g^c$ modulo $p$;

$s_{new} = \text{signature}_c(a_{new}, b_{new}, E)$;

$E = \text{encrypt}_z(m)$;

$s_{new} = \text{signature}_c(a_{new}, b_{new}, E)$ means that the entire quantity is signed.

As in the previous embodiments $y=g^x$ modulo p is the public key and x is the receiver secret key. The parameters g, x, and p are selected according to methods known to a person skilled in the art and the parameter g is a generator of the group $G_p$. In this embodiment, c is a random number and has a similar function as the random number "c" in the first embodiment. These parameters may be selected in accordance with El Gamal encryption.

At step 306 the transmitter processor 200 sends the quadruplet $(a_{new}, b_{new}, s_{new}, E)$ to the receiver processor 202.

At step 308 the receiver processor 202 verifies the signature on $s_{new}$ using methods known in the art.

At step 310 the receiver processor 202 decrypts $(a_{new}, b_{new})$ using the receiver secret key x to get the transmitter secret key z, i.e. in the following manner. $z = a_{new} / b_{new}^x$ modulo p.

At step 312 the receiver processor 202 uses the transmitter secret key z to decrypt E to determine the message m.

The transmitter processor 200 and receiver processor 202 may be personal computers which run computer software to implement the methods of the present invention and may be connected by a communications link such as communications link 200a. The transmitter processor 200 and receiver processor 202 may both have memory for storing intermediate or final data messages, ciphertexts, quadruplets, or other computer data signals as needed.

The last method is particularly advantageous for long data messages of many bits for "m". This is because $y^c$ can be thought of as a "blanket" which is used to hide what it is multiplied by. Thus in the earlier embodiment $y^c$ was multiplied by the message m. However, in that case the message m could only be as many bits as $y^c$ or the message m wouldn't be hidden. Therefore in the earlier embodiment of the present invention, the message size of m was limited to the size of $y^c$.

However, in the embodiment of FIGS. 3 and 4, $y^c$ was multiplied by z (the transmitter secret key) and thus z would be limited in size (i.e. no. of bits) to the number of bits for $y^c$. However, m would not be limited at all in size. The message "m" is made available to the receiver processor by encrypting it using z to form E and transmitting E to the receiver processor 202.

There may actually be a primary transmitter secret key z which can be chosen as, $z=g^\gamma$ modulo p, for a random value of $\gamma$ chosen from the set [0 . . . q]. The value q is chosen in accordance with known encryption methods such as El Gamal encryption. If this primary transmitter key z is not of the format used for producing the ciphertext E (e.g. is of the wrong length) then a secondary temporary key z' can be computed as z'=f(z), where f is an abitrary but agreed upon function, such as truncation. In the setting relating to triple—DES ("Digital Encryption Standard"), for example, one would want the key z' used for encryption of m to form E to be of the form $z_1, z_2$ such that $z_1$ and $z_2$ are both 56 bit keys. The quantities $z_1$ and $z_2$ can be called portion keys. In this example, the function would truncate the primary transmitter key z to a length of 112 bits, and then divide the resulting secondary transmitter key z' into two equal-sized portions $z_1$ and $z_2$, which can be done by letting $z_1$ be the first 56 bits of the secondary transmitter key z' and $z_2$ the remaining 56 bits.

Instead of employing the mathematical operations (i.e. the exponentiation and multiplication shown)

$a_{new} = z*y^c$ modulo $p$;

$b_{new} = g^c$ modulo $p$;

$s_{new} = \text{signature}_c(a_{new}, b_{new}, E)$ mathematical operations may be employed using elliptical curves as known in the art. The substitution of elliptical curve mathematical operations in cryptography is shown by "Use of Elliptic Curves in Cryptography", copyright 1998, by Victor S. Miller, Exploratory Computer Science, IBM Research, P.O. Box 218, Yorktown Heights, N.Y. 10598.; and "Non Supersingular Elliptic Curves for Public Key Cryptosystems" by Beth, Schaefer, 1998 from the Institut for Algorithmen and Kognitive Syteme Universitat Karksruhe, Fasanengarten 5, D-7500 Kariruhe 1.

We claim:

1. A method comprising the steps of:

encrypting a data message m at a transmitter processor using a primary transmitter secret key z, wherein z is known to the transmitter processor but not to a receiver processor, to form a quantity E;

preparing a quadruplet ($a_{new}$, $b_{new}$, $s_{new}$, E) at the transmitter processor where:

$$a_{new} = z * y^c \text{modulo } p;$$

$$b_{new} = g^c \text{modulo } p;$$

$$s_{new} = \text{signature}_c(a_{new}, b_{new}, E);$$

where $y = g^x$ modulo p, c is a random number, x is a receiver secret key of the receiver processor, and the parameters g, x, and p are picked using a known encryption method;

wherein $s_{new}$ is a signature which is determined by using the same random number c that was used to determine $a_{new}$ and $b_{new}$;

transmitting the quadruplet ($a_{new}$, $b_{new}$, $s_{new}$, E) from the transmitter processor to the receiver processor;

verifying the signature $s_{new}$ at the receiver processor;

decrypting $a_{new}$ and $b_{new}$ at the receiver processor by using the receiver secret key x to get the primary transmitter secret key z;

using the primary transmitter secret key z to decrypt the quantity E and thereby obtaining the message m at the receiver processor.

2. The method of claim 1 and wherein:

the step of decrypting $a_{new}$ and $b_{new}$ at the receiver processor using the receiver secret key x to get the primary transmitter secret key z is comprised of computing $z = a_{new}/b_{new}^x$.

3. The method of claim 1 wherein:

the primary transmitter secret key z is determined at the transmitter processor from the formula of $z = g^\gamma$ modulo p, where $\gamma$ is a random value chosen from the set [0 . . . q], where q is a value picked using a known encryption method.

4. A method comprising the steps of:

creating a primary transmitter key z at a transmitter processor wherein the primary transmitter key is known to the transmitter processor but not to a receiver processor;

creating a secondary transmitter key z' at the transmitter processor wherein the secondary transmitter key is known to the transmitter processor but not to the receiver processor, wherein the secondary transmitter key z' is a function of z;

encrypting a data message m, at the transmitter processor, using the secondary transmitter secret key z' to form a quantity;

preparing a quadruplet ($a_{new}$, $b_{new}$, $s_{new}$, E) at the transmitter processor, where:

$$a_{new} = z * y^c \text{modulo } p;$$

$$b_{new} = g^c \text{modulo } p;$$

$$s_{new} = \text{signature}_c(a_{new}, b_{new}, E);$$

where $y = g^x$ modulo p, c is a random number, x is a receiver secret key of the receiver processor, and the parameters g, x, and p are picked using a known encryption method;

wherein $s_{new}$ is a signature which is determined by using the same random number c that was used to determine $a_{new}$ and $b_{new}$;

transmitting the quadruplet ($a_{new}$, $b_{new}$, $s_{new}$, E) from the transmitter processor to the receiver processor;

verifying the signature $s_{new}$ at the receiver processor;

decrypting $a_{new}$ and $b_{new}$ at the receiver processor, using the receiver secret key x to get the primary transmitter secret key z;

modifying the primary transmitter secret key z, at the receiver processor, to obtain the secondary transmitter secret key z' and using the secondary transmitter secret key z' to decrypt the quantity E and thereby obtaining the message m, at the receiver processor.

5. The method of claim 4 and wherein:

the primary transmitter key z is provided which is not of the format used for producing the ciphertext E;

the secondary transmitter key z' is computed as a function of z, where the function is an arbitrary function.

6. A method comprising the steps of:

creating a primary transmitter key z at a transmitter processor;

creating a secondary transmitter key z' which is a function of z, at the transmitter processor;

providing a plurality of portion keys which are derived from the secondary transmitter key z', at the transmitter processor;

encrypting a data message m, at a transmitter processor, using the plurality of portion keys to form a quantity E;

preparing a quadruplet ($a_{new}$, $b_{new}$, $s_{new}$, E), at the transmitter processor, where:

$$a_{new} = z * y^c \text{modulo } p;$$

$$b_{new} = g^c \text{modulo } p;$$

$$s_{new} = \text{signature}_c(a_{new}, b_{new}, E);$$

where $y = g^x$ modulo p, c is a random number, x is a receiver secret key of a receiver processor, and the parameters g, x, and p are picked using a known encryption method;

wherein $s_{new}$ is a signature which is determined by using the same random number c that was used to determine $a_{new}$ and $b_{new}$;

transmitting the quadruplet ($a_{new}$, $b_{new}$, $s_{new}$, E) from the transmitter processor to the receiver processor;

verifying the signature $s_{new}$ at a the receiver processor;

decrypting $a_{new}$ and $b_{new}$, at the receiver processor, using the receiver secret key x to get the primary transmitter secret key z;

modifying the primary transmitter secret key z, at the receiver processor, to obtain the secondary transmitter secret key z' and using the secondary transmitter secret key z' to determine the plurality of portion keys and using the plurality of portion keys to decrypt the quantity E and thereby obtaining the message m, at the receiver processor.

7. The method of claim 1 wherein the signature $s_{new}$ is determined by using a Schnorr signature method.

8. The method of claim 1 wherein the signature $s_{new}$ is determined using a Digital Signature Standard.

9. An apparatus comprising a transmitter processor;

wherein the transmitter processor encrypts a data message m using a primary transmitter secret key z, known to the transmitter processor but not known to a receiver processor, to form a quantity E; and prepares a quadruplet ($a_{new}$, $b_{new}$, $s_{new}$, E) where:

$$a_{new} = z^* y^c \text{ modulo } p;$$

$$b_{new} = g^c \text{ modulo } p;$$

$$s_{new} = \text{signature}_c(a_{new}, b_{new}, E);$$

where $y = g^x$ modulo p, c is a random number, x is a receiver secret key of the receiver processor, and the parameters g, x, and p are picked using a known encryption method; and wherein $s_{new}$ is a signature, and wherein the transmitter processor determines $s_{new}$ by using the same random number c that was used to determine $a_{new}$ and $b_{new}$.

10. The apparatus of claim 9 wherein the transmitter processor uses a Schnorr signature method to determine $s_{new}$.

11. The apparatus of claim 9 wherein the transmitter processor uses a Digital Signature Standard to determine $s_{new}$.

12. The method of claim 1 wherein

El Gamal encryption is used for the encrypting steps.

13. The method of claim 4 wherein

El Gamal encryption is used for the encrypting steps.

14. The method of claim 6 wherein

El Gamal encryption is used for the encrypting steps.

15. The apparatus of claim 9 wherein

El Gamal encryption is used for encrypting.

\* \* \* \* \*